April 25, 1967 C. F. ROCKWELL 3,316,409

RADIATION SENSITIVE SURVEILLANCE FLAME DETECTOR WITH REDUCED EXTRANEOUS PICKUP

Filed April 17, 1963

INVENTOR.
CHARLES F. ROCKWELL
BY Kenway, Jenney & Hildreth
ATTORNEYS

United States Patent Office 3,316,409

Patented Apr. 25, 1967

3,316,409

RADIATION SENSITIVE SURVEILLANCE FLAME DETECTOR WITH REDUCED EXTRANEOUS PICKUP

Charles F. Rockwell, Sherborn, Mass., assignor to Fenwall, Incorporated, Ashland, Mass., a corporation of Massachusetts Filed Apr. 17, 1963, Ser. No. 273,689

7 Claims. (Cl. 250—214)

My invention relates to an improved surveillance flame detector. More particularly, it relates to a flame detector using silicon solar cells.

Surveillance flame detectors, which are used in aircraft for example, operate an alarm device if a fire is present in their area of surveillance which produces a flame. The presence of a flame is detected by a radiation sensitive cell which may respond either to visible light or to the infrared radiation emitted by the flame. In order to distinguish flame radiation from other types of radiation e.g. sunlight, the so-called "flame flicker frequency" is used. The output from the cell is supplied to an alternating voltage amplifier which has a pass band that includes the flame flicker frequency but does not include D.C. or higher frequencies. This amplifier then, accepts signals only at the flame flicker frequency which is, for a diffusion flame, between approximately 4 and 20 cycles per second and for a premixed flame up to 200 cycles per second. If a signal at these frequencies is present from a photosensitive cell located in a protected compartment, the presence of flame in the compartment is indicated. This signal may then be amplified and the amplifier output used to energize an alarm to warn of the flame or an actuating device to extinguish it. The term "actuating device" will be used herein and in the claims to refer to either an alarm or an actuating device.

Heretofore, the principal cells that have been used as radiation flame detectors were either lead sulfide or cadmium sulfide cells. However, cells of both of these materials suffer from a serious disadvantage in that their output signal diminishes substantially at the high temperatures that are present in a compartment where flame is also present. This means, that at normal temperatures, when no alarm signal is present, the detector must be made abnormally sensitive so that it will be sufficiently sensitive at high temperatures to provide an alarm signal. Because of the high sensitivity of the cells, alarm circuits of this type are subject to extraneous pickup, especially in an aircraft environment where there is substantial vibration, transient voltage phenomenon, stray electric fields, etc. This results in a high false alarm rate. For this reason, radiation flame detector circuits have not found wide use.

I have found that a substantially improved radiation flame detector which overcomes these disadvantages can be provided by utilizing silicon solar cells as radiation detectors in place of the lead sulfide or cadmium sulfide cells proviously used. The silicon cell has a substantially constant short-circuit current output for a given radiation signal as a function of temperature, although the open circuit voltage output diminishes logarithmically with temperature. Thus in a compartment in which flame is occurring and the temperature may be very high, the voltage output from a silicon cell is apt to be only a very small percentage of its output voltage at lower temperatures. However, the short-circuit output current will remain substantially constant. I utilize this property of the silicon cell by providing a tuned amplifier having avery low input impedance; this amplifier responds to the current output from the silicon cell. Thus, I use the silicon cell as a detector which generates a current as a function of the condition to be sensed, in this case the radiation from the flame; because of the low input impedance of the amplifier to which I supply the silicon cell signal, this voltage variation is of minor importance. Further, since the leads connecting the cell to the amplifier are connected to a low impedance device, the extraneous pickup is substantially reduced as compared to the pickup obtained with lead sulfide or cadmium sulfide cells.

By using silicon cells in this manner, I have found that the radiation flame detector is a much more reliable and useful device. Further, because the silicon cell actually generates a signal rather than providing an impedance variation which can be sensed, it is unnecessary to carry power supply leads to the compartment in which the cell is located as well as signal leads. Also, because the cells are used as current sources, several of them may readily be connected to a single amplifier, and if they survey the same area the sensitivity of the flame detector is thereby increased.

From the foregoing, it will be seen that it is a principal object of my invention to provide an improved radiation flame detector for use in detecting the presence of flame by observing the radiation from the flame at the flame "flicker" frequency. Another object of my invention is to provide an improved radiation flame detector of the type described utilizing a silicon solar cell. A still further object of my invention is to provide a radiation flame detector which has a lower false alarm rate than the detectors heretofore available. Still another object of my invention is to provide an amplifier capable of amplifying the signals from a plurality of silicon solar cells used as flame detectors. Other and further objects of my invention will in part be obvious and will in part appear hereinafter. My invention accordingly comprises the features of construction, combination of elements and arrangement of parts which will be exemplified in the construction hereinafter set forth, and the scope of the invention will be indicated in the claims.

For a fuller understanding of the nature and objects of my invention, reference should be had to the following detailed description taken in connection with the accompanying drawings in which.

Figure 1:
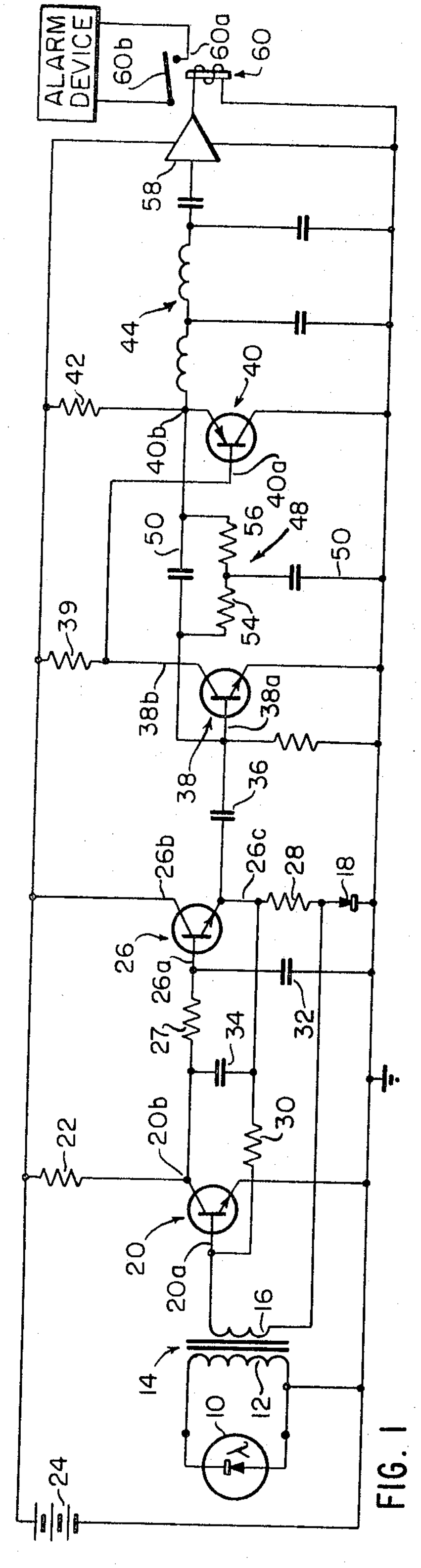
FIG. 1 is a circuit diagram showing the manner in which a silicon solar cell is used in combination with a low impedance amplifier to provide a surveillance flame detector.

As shown in FIG. 1, the radiation flame detector of my invention includes a solar cell 10 which is located in the area in which flame is to be detected. The cell is connected to the primary winding 12 of a transformer generally indicated at 14. The secondary winding 16 of the transformer 14 is connected to ground through the diode 18. The upper end of the secondary winding being connected to the base 20_a_ of the transistor generally indicated at 20. The collector 20_b_ of the transistor is connected through the resistor 22 to the positive terminal of the amplifier power supply here shown as a battery 24 for illustrative purposes. The emitter of transistor 20 is grounded.

The signal appearing at the collector 20_b_ of the transistor 20 is connected to the base 26_a_ of the transistor generally indicated at 26 through resistor 27. Transistor 26 is connected as an emitter follower, the emitter impedance being the series combination of the resistor 28 and the diode 18. In accordance with usual practice, the collector 26_b_ of transistor 28 is connected directly to the positive terminal of the amplifier power supply.

Negative voltage feedback from the emitter 26c of transistor 26 to the base 20a of transistor is provided by resistor 30 for purposes to be explained below. As shown a capacitor 32 is connected between the base of transistor 26 and ground and a second capacitor 34 is connected between the emitter of transistor 26 and the collector of transistor 20. These two capacitors operate in association with associated impedances to provide a low pass filter.

The two transistors 20 and 26 together with their associated circuit form the first amplifier stage and, as will be explained provide a very low impedance to the silicon solar cell.

The output signal from the amplifier first stage which appears at the emitter of tranesistor 26 is coupled to succeeding stages through capacitor 36, the capacitor being connected to the base 38a of transistor 38. Transistor 38 functions as a conventional amplifier in the common emitter connection, the collector resistor being identified by the reference numeral 39. The output sigal appearing at the collector 38b of transistor 38 is directly coupled to the base 40a of the transistor generally indicated at 40. The transistor 40, is a pnp transistor also connected as an emitter follower, the emitter impedance being the resistor 42. The signal appearing at the emitter 40b of transistor 40 is supplied as the input signal to a low pass filter generally indicated at 44.

Additionally, a bridged T negative feedback network generally indicated at 48 is included between the emitter 40b of transistor 40 and the base of transistor 38. This network includes capacitors 50 and 52 and resistors 54 and 56. The function of the network 48 is to optimize the response of the amplifier as a function of frequency to the signals from the first stage, as will be further discussed below. The output signal from the low pass filter 44 is supplied to a conventional transistor amplifier 58. When the output signal from amplifier 58 is sufficiently large, it operates the relay generally indicated at 60. The contacts 60a and 60b of relay 60 may be connected in an appropriate circuit to provide a visual or audible alarm or to control an actuating device to put out the flame which has been sensed.

As has been previously discussed, it is important that the amplifier to which the signal from the cell 10 is supplied presents a very low input impedance. The reason for this can be understood by reference to FIG. 2, which is a plot of cell output voltage as a function of temperature, the cell output being normalized to that at room temperature. It will be observed that if the cell is supplying a load impedance of as little as 1000 ohms, its output signal is substantially less than 1/10 its room temperature output in the 400° F. to 500° F. range. Even if the cell load impedance is reduced to approximately 100 ohms, which is lower than the normal input impedance of a transistor amplifier, the situation is not greatly improved; at these levels of load impedance the cell output drops so substantially at the temperatures at which a flame is likely to occur that the circuit must be made extremely sensitive. Since the environment in which the circuit operates is very noisy, the extreme sensitivity of the associated circuitry provides little improvement in signal to noise ratio.

In practice, I have found that it is impossible to provide load impedances for the cell 10 of less than one ohm. As can be seen from FIG. 2, the output signal at this level of load impedance for the cell remains within about 20 percent of its value at room temperature with increasing temperature. Thus, the amplifier circuit may be optimized for operation at room temperature with substantial assurance that it will operate satisfactorily at the much higher temperatures which occur when flame is present.

Returning to the circuit of FIG. 1, negative voltage feedback is provided by feeding the output signal from transistor 20 to the emitter follower 26, the output signal from the emitter follower being in turn supplied via resistor 30 to the base of transistor 20. The effect of this negative feedback is to substantially lower the input impedance to the amplifier. Although a feedback signal might be taken from the collector 20b of transistor 20 to the base, it is preferable to take it from a low impedance point, such as the emitter 26c of transistor 26. Using the feedback circuit shown, I have found it possible to obtain an input impedance between the base transistor 20 and ground of about 200 ohms using conventional transistors.

The transformer 14 has a turns ratio of 20:1. Therefore, when the amplifier impedance is transformed theoretically, and for an ideal transformer to the input side of the transformer, the effective input impedance of the amplifier, as seen by the cell, would be ½ ohm. However in practice because of the fact that the transformer is not ideal, the actual impedance is about 3 ohms.

The capacitors 32 and 34 in combination with resistors 27 and 30 and transistor 26 provide an "active" low pass filter since the capacitor 34 is in effect, a part of a feedback loop around the transistor 26. This circuit is designed to have a pass band for a diffusion flame which extends to about 20 cycles, and has a peak at about 10 cycles. So-called "active" low pass filters of this type using an emitter follower, are more fully described in an article by Myer appearing in "Electrical Design News" for April 1960.

In many applications for surveillance flame detectors, including aircraft applications, the amplifier, as well as the detector is subjected to wide temperature variations. In aircraft for example, ambient temperatures to which the amplifier is subjected may range from −65° F. to as high as +165° F. If an amplifier using transistors is used to amplify the signal from the silicon solar cell, its gain may vary widely over this range, giving rise to false alarms, or failing to give warning of the presence of flames. To overcome this problem, I provide temperature compensation for the amplifier in the following manner.

It will be recalled that the secondary winding 16 of transformer 14 is grounded through the silicon diode 18 rather than being directly grounded. The diode 18 also forms a part of the load impedance for the emitter follower 26. The function of diode 18 is to provide a small feedback voltage which varies in accordance with the ambient temperature so that the direct bias on transistor 20 remains constant with changing temperature and therefore the operating points of transistors 20 and 26 remain constant.

Thus the overall gain of the first stage, including transistors 20 and 26, will tend to remain substantially constant, despite wide variations in temperature and the surveillance flame detector will perform satisfactorily over these wide variations because of both the negative feedback and diode compensation.

The signal appearing at the output of the emitter follower 26 and supplied to the base of transistor 38a is further filtered by the bridged T network included in the negative feedback path from the emitter of the transistor 40 to the base of the transistor 38. This network provides, in effect, a band pass filter, passing only the band of frequencies of interest. However, neither the low frequency or high frequency cut-offs are sharp. While the cut-off need not be sharp at the low frequency end of the pass band, since relatively little noise is generated there, the high frequency cut-off is important. To make this cut-off sharp, I provide the low pass filter generally indicated at 44; the filter cuts off sharply at the upper limit of the pass band of interest. After passing through filter 44 the signal is further amplified by amplifier 58 and, if sufficiently large, causes operation of the relay 60, or other appropriate switching device.

Figures 2, 3:
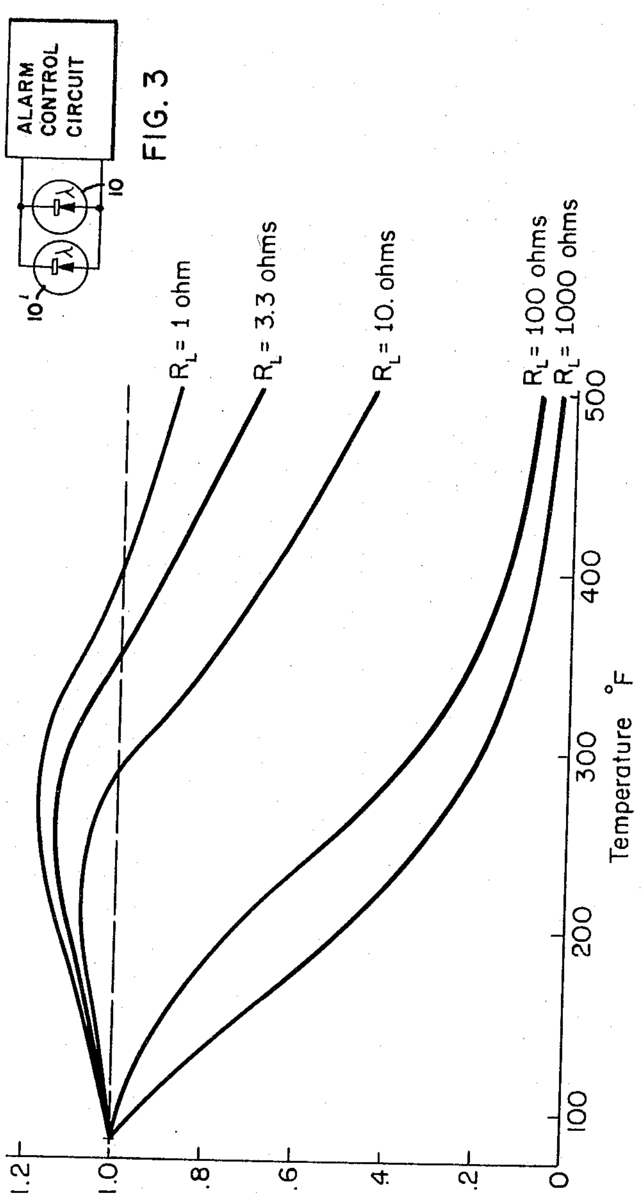
FIG. 2 is a graph of the output of a typical silicon solar cell as a function of temperature, the different curves showing the variation in output voltage with temperature as a function of the impedance into which the cell is working.
FIG. 3 is a circuit diagram of a modified form of the apparatus of FIG. 1.

It will be understood of course, that while I have shown only a single silicon solar cell connected to the input terminals of the primary winding 12 of transformer 14, in practice a plurality of cells might be so connected. Such a plurality of cells may be connected in parallel with no decrease in sensitivity of individual cells. The sensitivity of the system to a particular radiation source will be increased in proportion to the number of cells connected in parallel which are subjected to radiation from that source. FIG. 3 shows two such cells 10 and 10' connected in parallel in a circuit that may otherwise be the same as that shown in FIG. 1. Additionally, while I have described in some detail the filter circuits and temperature compensation circuit which I have included in a preferred embodiment of my invention, it is to be understood that other filter circuits might be used, if desired, to shape the amplifier frequency response.

Thus, I have provided an improved surveillance flame detector using, as a sensing element, a silicon solar cell. This cell is used in combination with an alternating voltage amplifier having an input impedance which is sufficiently low that the cell functions as a current source, and the amplifier input signal therefore remains substantially constant at temperatures up to approximately 500° F. In the amplifier used in the surveillance flame detector of my invention, I provide filter circuits to limit the amplifier bandwidth to the frequencies of interest. Further, I also provide for temperature compensation of the amplifier so that it may operate over a wide range of ambient temperatures as heretofore described.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A surveillance flame detector comprising, in combination, a silicon solar cell responsive to radiation from the flames to be detected, said solar cell having a substantially constant short circuit current output for a given radiation signal as a function of temperature, an alternating voltage amplifier, means connecting said cell to the input terminals of said amplifier, the input impedance of said amplifier being sufficiently low that the input signal thereto from said solar cell remains substantially constant between −65° F. and 500° F., an actuating device, and means connecting said actuating device to the output terminals of said amplifier, whereby a signal from said cell actuates said device.

2. The combination defined in claim 1 in which said alternating voltage amplifier includes a bandpass filter, the pass band of said filter including the flicker frequency of the flame to be detected.

3. The combination defined in claim 1 in which said alternating voltage amplifier includes transistors as active amplifying elements and means for maintaining the gain of said amplifier substantially constant over an ambient temperature range extending from −65° F. to +165° F.

4. The combination defined in claim 1 which includes at least one additional silicon solar cell connected in parallel with said first-mentioned cell, all of said cells surveying substantially the same area to thereby increase the sensitivity of said detector.

5. A surveillance flame detector comprising in combination, a silicon solar cell responsive to radiation from the flame to be detected, an alternating voltage amplifier having input terminals and output terminals, a transformer having a primary and a secondary winding, the primary winding of said transformer being connected to said cell and the secondary winding being connected to the input terminals of said amplifier, said amplifier including a first transistor connected as an amplifier having an input terminal and a common terminal connected to said amplifier input terminals and an output terminal, a second transistor connected as an emitter follower having an input terminal, an output terminal and a common terminal, means connecting the output terminal and common terminal of said first transistor to the input terminal and common terminal of said emitter follower, and means connecting the emitter terminal of said emitter follower to the input terminal of said first transistor, to thereby provide negative feedback around said first transistor and reduce its input impedance, an actuating device and means connecting said actuating device to the output terminal and common terminal of said emitter follower, whereby the signal from said cell energizes said device.

6. The combination defined in claim 5 in which said means connecting said first transistor to said emitter follower includes a low pass filter, said filter including a series resistor and a shunt capacitor connected between the output terminal of said first transistor and the base terminal of said emitter follower; and a second capacitor connected between the emitter terminal of said emitter follower and that end of said series resistor which is connected to the output terminal of said first transistor, said emitter follower, resistor and capacitors forming an active low pass filter.

7. The combination defined in claim 5 which includes means for temperature compensating said first transistor amplifier for changes in gain as a function of variations in ambient temperature.

References Cited by the Examiner

UNITED STATES PATENTS

| | | | |
|---|---|---|---|
| 2,892,165 | 6/1959 | Lindsay | 330—23 X |
| 2,911,540 | 11/1959 | Powers | 340—228 |
| 3,040,265 | 6/1962 | Forge | 330—23 X |
| 3,105,198 | 9/1963 | Higginbotham | 330—29 X |
| 3,110,814 | 11/1963 | Kennon | 250—214 |

RALPH G. NILSON, *Primary Examiner.*

WALTER STOLWEIN, *Examiner.*